United States Patent
Wawrzola et al.

(10) Patent No.: US 11,619,345 B2
(45) Date of Patent: Apr. 4, 2023

(54) AUTOMATIC LUBRICATOR FOR LUBRICATING AN OBJECT

(71) Applicant: Dodge Industrial, Inc., Oxford, CT (US)

(72) Inventors: Grzegorz Wawrzola, Kielce (PL); Daniel Lewandowski, Cracow (PL); Eric Lambert, Central, SC (US); Piotr Ryba, Humniska (PL); Greg Hewitt, Taylors, SC (US); Artur Rdzanek, Simpsonville, SC (US)

(73) Assignee: Dodge Industrial, Inc., Oxford, CT (US)

( * ) Notice: Subject to any disclaimer, the term of this patent is extended or adjusted under 35 U.S.C. 154(b) by 485 days.

(21) Appl. No.: 16/730,189

(22) Filed: Dec. 30, 2019

(65) Prior Publication Data
US 2021/0199240 A1 Jul. 1, 2021

(51) Int. Cl.
*F16N 7/14* (2006.01)
*F16N 29/04* (2006.01)

(52) U.S. Cl.
CPC .............. *F16N 7/14* (2013.01); *F16N 29/04* (2013.01); *F16N 2250/06* (2013.01); *F16N 2270/70* (2013.01)

(58) Field of Classification Search
CPC ........ F16N 7/14; F16N 2270/70; F16N 11/08; F16N 29/04; F16N 2250/06
USPC .......................................... 184/7.4; 700/283
See application file for complete search history.

(56) References Cited

U.S. PATENT DOCUMENTS

| 3,267,371 A | 8/1966 | Greve |
| 6,216,822 B1 | 4/2001 | May et al. |
| 7,228,941 B2 * | 6/2007 | Weigand ................. F16N 11/08 184/7.4 |

(Continued)

FOREIGN PATENT DOCUMENTS

| CN | 208457553 | 2/2019 |
| DE | 102011053027 | 2/2013 |
| KR | 1020150117158 | 10/2015 |

OTHER PUBLICATIONS

International Search Report and Written Opinion, Counter PCT Appln. No. PCT/US20/67330, dated Mar. 26, 2021, 8 pgs.

(Continued)

*Primary Examiner* — Michael R Mansen
*Assistant Examiner* — Mark K Buse
(74) *Attorney, Agent, or Firm* — Robinson & Cole LLP (57) ABSTRACT

An automatic lubricator for lubricating an object is provided. The lubricator includes a housing with a coupling section configured to couple with a lubricant container containing a lubricant, wherein the lubricant container comprises a rotatable shaft with a piston to dispense the lubricant from an output of the lubricant container. The lubricator further comprises an electric motor configured to drive the rotatable shaft of the lubricant container, such that at least a part of the lubricant is dispensable from the lubricant container, at least one sensor configured to provide a sensor signal indicative of at least one of a force exerted by the electric motor onto the rotatable shaft and a force exerted by the lubricant onto the container, and a control circuitry configured to determine a blockage of the output of the lubricant container based on the sensor signal of the at least one sensor.

23 Claims, 2 Drawing Sheets

(56) References Cited

U.S. PATENT DOCUMENTS

| | | | |
|---|---|---|---|
| 9,458,964 B2* | 10/2016 | Eisenbacher | ........... F16N 11/08 |
| 9,689,530 B2* | 6/2017 | Lehnert | ..................... H02P 7/29 |
| 2003/0076119 A1 | 8/2003 | Horz et al. | |
| 2004/0099483 A1 | 5/2004 | Song | |
| 2007/0144834 A1 | 6/2007 | Matzan | |
| 2008/0271949 A1 | 11/2008 | Tokuyama et al. | |
| 2011/0153094 A1* | 6/2011 | Botha | ..................... F16N 11/00 |
| | | | 700/283 |
| 2011/0253481 A1 | 10/2011 | Lin | |
| 2016/0369782 A1 | 12/2016 | Lee | |
| 2021/0102663 A1* | 4/2021 | Wawrzola | ................. F16N 7/00 |
| 2021/0102664 A1* | 4/2021 | Wawrzola | ............... F16N 11/08 |
| 2021/0199241 A1* | 7/2021 | Wawrzola | ............... F16N 29/04 |
| 2021/0199242 A1* | 7/2021 | Wawrzola | ............... F16N 29/02 |

OTHER PUBLICATIONS

International Search Report and Written Opinion, PCT Appln. No. PCT/US20/67328, dated Mar. 26, 2021, 10 pgs.
International Search Report and Written Opinion, PCT Appln. No. PCT/US20/67331, dated Mar. 26, 2021, 11 pgs.

* cited by examiner

AUTOMATIC LUBRICATOR FOR LUBRICATING AN OBJECT

TECHNICAL FIELD

The present invention relates to an automatic lubricator and/or lubrication device for lubricating an object. The invention further relates to a lubrication system comprising such lubricator, a method of operating such lubricator, a computer program, and a non-transitory computer-readable medium storing such computer program.

TECHNICAL BACKGROUND

Automatic lubricators, lubrication devices and/or lubrication systems are usually used for ensuring a smooth and reliable operation of an apparatus, engine, device and/or industrial system by lubricating one or more objects, parts, portions and/or members thereof. Such objects, parts, portions and/or members can, for example, be and/or comprise a bearing, a shaft or the like.

Generally, an automatic lubricator can automatically apply lubricant onto and/or into the object that should be lubricated at a specified lubrication time, with a certain lubrication frequency and/or in certain lubrication time intervals. This can render a manual application of the lubricant unnecessary and hence allow to reduce maintenance effort and costs. Therein, a selection of an appropriate lubricant and/or time of lubrication can prevent a failure of the object, the apparatus, engine, device and/or the industrial system, thereby allowing to extend the lifetime thereof.

SUMMARY

According to the present disclosure, there is provided an improved lubricator, e.g. that provides improved and/or enhanced functionality.

This is achieved by the subject matter of the independent claims, wherein further embodiments are incorporated in the dependent claims, the following description and the appended figures. According to a first aspect of the present disclosure, there is provided an automatic automated and/or at least partly automated lubricator for lubricating an object. Generally, the lubricator may refer to a lubrication device configured to apply lubricant onto and/or into at least a part of the object. The lubricator comprises a housing with a coupling section configured to couple with a lubricant container for containing and/or containing a lubricant, wherein the lubricant container comprises a rotatable shaft with a piston to dispense the lubricant from an output and/or outlet of the lubricant container. The lubricator further comprises an electric motor configured to drive the rotatable shaft of the lubricant container, e.g. during at least one lubrication action, such that at least a part of the lubricant is dispensable, can be dispensed and/or is dispensed from the lubricant container, e.g. during the at least one lubrication action. The lubricator further comprises at least one sensor configured to provide a sensor signal indicative of at least one of a force exerted by the electric motor onto the rotatable shaft and a force exerted by the lubricant onto the container, e.g. onto a container wall, the piston and/or the rotatable shaft (and/or other parts or components of the container). Further, the lubricator comprises a control circuitry configured to determine and/or automatically determining a blockage, e.g. a partial blockage or a full and/or complete blockage, of the output of the lubricant container based on the sensor signal of the at least one sensor and/or based on processing the sensor signal of the at least one sensor.

Here and in the following, the "object" can refer to any part, portion and/or member that should be lubricated. For instance, the object can refer to a movable part of an apparatus, device, system and/or industrial system, such as e.g. a motor, an engine or the like. Such a movable part can, for example, be a bearing, a shaft, a drive shaft or the like.

By detecting the blockage of the container's output, it can be ensured that the object is sufficiently lubricated and e.g. a malfunction of the object and/or a system or apparatus comprising the object resulting from insufficient lubrication can be reliably and efficiently avoided. In turn, this may allow increasing a lifetime of the object and/or the system or apparatus comprising the object. Also, maintenance efforts and costs can be reduced by means of the lubricator according to the present invention.

Generally, the present invention may be considered as being based on the following insights and findings. It may be desirable to increase an efficiency and reliability of an object and/or a system or apparatus comprising the object, such as e.g. an industrial system. Preferably, an automatic lubricator should be able to detect an abnormal work condition of the lubricator and/or the container coupled thereto, e.g. to prevent a situation which could possibly adversely affect the object and/or the system or apparatus comprising the object. Such abnormal working condition, is for example a lubricant container output blockage, which may prevent proper dispensing of the lubricant from the container and could lead to insufficient lubrication of the object. In turn, this could shorten a lifetime of the object and/or the system or apparatus comprising the object.

By means of the lubricator according to the present invention, the force exerted by the electric motor onto the rotatable shaft and/or the force exerted by the lubricant onto the container and/or any other quantity or measure correlating with the force exerted onto the shaft or the container, such as e.g. a pressure or torque, can be determined, detected and/or monitored. As the force needed for dispensing the lubricant from the output and/or the force exerted by the lubricant onto the container increases in case a partial or full blockage of the container's output occurs, the blockage of the output can reliably, efficiently, cost-efficiently and quickly be detected, determined and/or monitored, in particular independent on other work conditions, such as e.g. vibration, moisture and/or temperature. In other words, by determining, detecting and/or monitoring the force or any other quantity or measure correlating therewith, such as e.g. a pressure or torque, a situation when the container output is blocked can reliably be detected.

It should be noted that the sensor of the lubricator can be configured to determine any quantity or measure correlating with and/or being indicative of the force exerted by the electric motor onto the shaft and/or piston, such as e.g. the force, a pressure and/or a torque. Accordingly, the sensor may be configured to sense a quantity or measure correlating with the force exerted by the electric motor in a direction parallel and/or transverse to the rotatable shaft. Alternatively or additionally, the sensor can be configured to determine any quantity or measure correlating with and/or being indicative of the force exerted by the lubricant onto the container, the container wall, the piston, the shaft, and/or any other component or part of the container.

Further, it should be noted that the sensor can be positioned and/or arranged at any position or location suitable for determining the force, pressure, and/or torque exerted by the electric motor onto the shaft. For instance, the sensor can be positioned between the rotatable shaft and the electric motor (and/or a rotating part thereof), between a top surface of the rotatable shaft that faces the electric motor and the electric motor (and/or a rotating part thereof), and/or between the electric motor (and/or a rotating part thereof) and a lateral surface of the rotatable shaft, e.g. between a lateral surface of an end of the rotatable shaft facing the electric motor and the electric motor (and/or the rotating part thereof). Alternatively or additionally, the sensor can be positioned inside the container, e.g. on a wall of the container, on the piston or on the shaft.

The coupling section of the housing can be configured for being coupled to the lubricant container or at least a part thereof. For instance, the coupling section of the housing can be configured for being detachably attached and/or mechanically coupled to the lubricant container. Alternatively or additionally, the coupling section can be configured for engaging with at least a part of the lubricant container. The lubricant container and the coupling section may, for instance, be coupled via a threaded coupling or any other suitable coupling allowing to attach and/or detach the container to the housing.

The lubricant container (also referred to as "container") can refer to any type of container, cartridge, can and/or tank configured to store and/or contain a lubricant. The rotatable shaft of the container can, for example, refer to a rotatable screw. The piston of the container can be displaceably arranged on, attached to and/or mounted to the rotatable shaft of the lubricant container. By rotation of the rotatable shaft, the piston can be moved and/or displaced along the rotatable shaft, e.g. in direction towards the output and/or outlet of the container, such that lubricant can at least partly be pushed and/or moved by the piston out of the output of the container to lubricate the object.

The electric motor can be an arbitrary type of electric motor, such as e.g. a DC motor, an AC motor, a brushed motor or a brushless motor. The electric motor can be supplied with electrical power by a power supply of the lubricator. The power supply can be connected to a supply grid or it can comprise one or more batteries and/or accumulators.

The control circuitry may refer to a control circuit, a controller and/or a control unit configured to actuate and/or control the electric motor. The control circuitry may be coupled to the electric motor by one or more electric lines. The control circuitry may be configured to switch-on the electric motor. For instance, the control circuitry may switch-on the electric motor by activating the power supply for supplying electrical power to the electric motor and/or by coupling the electric motor to the power supply, e.g. based on actuating a switch arranged in a supply line connecting the power supply and the electric motor. Further, the control circuitry may be configured to switch-off the electric motor. The electric motor may be switched-off by the control circuitry e.g. by deactivating the power supply and/or by decoupling the electric motor from the power supply.

Further, the lubricator can comprise a data storage and/or data storage device. The data storage may be part of and/or may be coupled to the control circuitry. The control circuitry may further comprise one or more processors, e.g. one or more microcontrollers or the like. The data storage may store software instructions and/or a computer program, which, when executed by the one or more processors of the control circuitry instructs the lubricator to perform the functional features and/or functionalities described above and in the following with reference to the lubricator.

According to an embodiment, the at least one sensor is arranged within the housing of the lubricator. By arranging the sensor in the housing of the lubricator, the container can be replaced without replacing the sensor. Accordingly, the sensor may be physically disconnected from the container itself, such the sensor may be independent from the lubricant container and can be used when the lubricant container has been replaced. Also, this may allow using containers of different sizes, geometries, volumes and/or shapes. In turn, costs of the sensor may not be connected and/or associated with the container. Additionally, during e.g. the replacement of the lubricant container, no additional effort may be needed.

According to an embodiment, the at least one sensor is arranged at an end of the electric motor, such that the at least one sensor is arranged between the rotatable shaft and the electric motor, when the lubricant container is coupled to the lubricator. For instance, the electric motor may comprise a rotating part for driving the rotatable shaft, and the sensor may be mounted between the rotating part and the rotatable shaft. This way, the force and/or pressure exerted by the electric motor can be accurately, reliably and precisely detected by means of the sensor.

According to an embodiment, the at least one sensor is mechanically coupled and/or mounted to a rotating part of the electric motor, such that the at least one sensor rotates in correspondence with a rotation of the rotating part of the electric motor and/or in correspondence with the rotatable shaft. Accordingly, the sensor may rotate with the same speed and/or rotating speed as the rotating part and/or as the rotatable shaft.

According to an embodiment, the control circuitry is configured to determine, based on the sensor signal and/or based on processing the sensor signal, a measure correlating with the force exerted by the electric motor onto the rotatable shaft, wherein the control circuitry is configured to determine the blockage, e.g. a partial or full blockage, of the output based on comparing the determined measure with a threshold value. By way of example, the measure correlating with the force may be a force, a pressure, a torque and/or any other quantity or measure correlating therewith. The control circuitry may be configured to derive the measure from the sensor signal and compare the measure with the threshold value for the measure. This may allow to determine an excessive force, pressure and/or torque exerted by the electric motor onto the shaft, e.g. when the measure reaches or exceeds the threshold value, which can serve as an indication of an occurrence of a partial or full blockage of the output.

According to an embodiment, the lubricator further comprises a data storage, wherein the threshold value is stored in the data storage. Alternatively or additionally, the threshold value can be retrieved from another source, e.g. remote from the lubricator. For instance, the threshold value may be retrieved via a communication circuitry and/or a communication interface of the lubricator, e.g. from a database or the like.

The threshold value may, for example, be determined in a calibration measurement and/or in a simulation calculation. The control circuitry may be configured to compare the determined measure with different threshold values, e.g. depending on a type of container and/or a type of the container's output (and/or its cross-section). For example, a plurality of threshold values may be stored in the data storage and the control circuitry may be configured to select one of the threshold values depending on the type of container in order to compare the determined measure with the selected threshold value.

According to an embodiment, the lubricator further comprises a rotatable circuit board, e.g. a printed circuit board (PCB), mechanically coupled to a rotating part of the electric motor, such that the rotatable circuit board rotates in correspondence with a rotation of the rotating part of the electric motor, with the sensor, and/or with the rotatable shaft. Accordingly, the circuit board may rotate with the same speed and/or rotating speed as the rotating part, the sensor, and/or the rotatable shaft.

According to an embodiment, the rotatable circuit board is electrically coupled with the at least one sensor. Via the rotatable circuit board and its electrical connection with the senor, the sensor may be supplied with electrical energy and/or the sensor signal may be transmitted to the control circuitry.

According to an embodiment, the rotatable circuit board comprises at least one circular read-out track arranged on one side of the rotatable circuit board, wherein the at least one circular read-out track is electrically coupled with the at least one sensor for reading-out the sensor signal of the at least one sensor. By means of the at least one circular read-out track, it may be ensured that the sensor signal can be transmitted to the control circuitry during a lubrication action, e.g. during rotation of the rotating part of the electric motor, the sensor and the rotatable circuit board.

According to an embodiment, the rotatable circuit board comprises a plurality of concentric circular read-out tracks. This may allow to transmit various or different components of the sensor signal via different read-out tracks to the control circuitry. Alternatively or additionally, the sensor signal may redundantly be transmitted via the plurality of read-out tracks to the control circuitry.

According to an embodiment, the lubricator further comprises a read-out interface arranged at an end of the electric motor, wherein the read-out interface is coupled to the at least one circular read-out track and to the control circuitry, such that the sensor signal of the at least one sensor is transmittable via the read-out interface to the control circuitry. The read-out interface may e.g. be arranged at a static and/or fixed position and/or it may not rotate with electric motor's rotating part, the sensor and the rotatable circuit board. During rotation of the circuit board, however, the read-out interface may be in electrical contact with the one or more read-out tracks of the rotatable circuit board, thereby allowing to transmit the senor signal from the sensor via the rotatable circuit board to the control circuitry.

According to an embodiment, the read-out interface comprises at least one spring probe in contact with the at least one circular read-out track of the rotatable circuit board. For instance, the spring probe may be spring-loaded, e.g. to ensure an electrical contact with the at least one circular read-out track. A spring probe may be advantageous in terms of providing a reliable, long-lasting and low-wear electrical connection between the spring probe and the one or more read-out tracks.

According to an embodiment, the control circuitry comprises a control circuit board, e.g. a printed circuit board, wherein the rotatable circuit board and the control circuit board are arranged on opposite sides of the electric motor. It should be noted, however, that the control circuit board may be arranged at any other suitable location or position. Also, a plurality of control circuit boards may be used. Further, the control circuitry may be part of the control circuit board or vice versa.

According to an embodiment, the lubricator further comprises a communication circuitry configured to transmit a signal related to and/or indicative of the output blockage to a receiver. The communication circuitry may be a wired communication circuitry or a wireless communication circuitry. By way of example, the signal may be a warning signal indicating a blockage of the output of the container. Further, the control circuitry may be configured to trigger transmission of the signal via the communication circuitry, when a blockage of the output is determined.

By means of the communication circuitry, an enhanced functionality of the lubricator can be provided. For instance, this provides the possibility of setting one or more parameters of the lubricator and reading one or more sets of data without necessity of dismounting the lubricator from the lubrication site and even without coming too close to this site, as in many cases the automatic lubricators are placed in places with difficult or dangerous access. In such situation the communication circuitry, particularly providing wireless connectivity to the lubricator, can be advantageous as it can allow to reduce the number of LEDS, displays, switches and buttons mounted on the hardware, and in such a way decrease the cost while improving readability of data exchanged with the lubricator. For instance, the lubricator and/or the communication circuitry can comply with at least one wireless communication standard, such as e.g. Bluetooth or W-Fi, so that it can be accessed with a user device like a smartphone or a laptop rather than with a dedicated hardware. Hence, the lubricator might be able to exchange data, signals and/or commands with an external device which only needs to be equipped with corresponding software. Also, this can allow to avoid additional costs associated with a dedicated device designed only for communication with the lubricator. Moreover, a wireless communication can allow for placing the lubricator in hard-to-reach destinations without necessity of providing cables to connect to the device and change settings or read the data regarding the operation of the lubricator.

The communication circuitry may be and/or comprise a radio module that can be embedded into the lubricator, e.g. so that it is protected by the housing against damage, dust and humidity. This can be of particular advantage in an environment with heavy machinery where the lubricators are normally placed.

Further, based on the communication circuitry, operation of the lubricator can be monitored, e.g. without necessity of visual inspection of the lubricator mounted on a machine. Based on the communication circuitry, a self-monitoring feature, which can e.g. verify the status of the lubricator, can be implemented. For instance, a notification, a warning, a signal, a warning signal and/or an alarm message can be transmitted via the communication circuitry and/or a corresponding communication interface that is preferably configured for wireless transmission. For instance, this can allow to recognize if the lubricator is working properly or not, without visual inspection of the lubricator. Also, a signal regarding the status of the lubricator and/or the container can be received from the lubricator, e.g. on an external device.

A second aspect of the present disclosure relates the use of the lubricator, as described above and in the following, for lubricating an object.

A third aspect of the present disclosure relates to a lubrication system for lubricating an object. The lubrication system comprises a lubricant container configured to contain and/or containing a lubricant and including a rotatable shaft with a piston to dispense the lubricant from an output of the lubricant container. The lubrication system further comprises a lubricator, e.g. a lubricator as described hereinabove and hereinbelow. The lubricator and/or the lubrication system includes a housing with a coupling section configured to couple and/or coupled with the lubricant container, an electric motor configured to drive the rotatable shaft of the lubricant container and/or to displace the piston, e.g. during at least one lubrication action, such that at least a part of the lubricant is dispensable and/or is dispensed from the lubricant container. The lubricator and/or the lubrication system further comprises at least one sensor configured to provide a sensor signal indicative of at least one of a force exerted by the electric motor onto the rotatable shaft and a force exerted by the lubricant onto the container. The lubricator and/or the lubrication system further comprises a control circuitry configured to determine a blockage of the output of the lubricant container based on the sensor signal of the at least one sensor.

A fourth aspect of the present disclosure relates to a method of operating an automatic lubricator couplable and/or configured to be coupled to a lubricant container. The method according to the fourth aspect may also relate to a method of operating a lubrication system and/or of lubricating an object, e.g. using the lubricator and/or the lubrication system. The method comprises:

- actuating, with a control circuitry of the automatic lubricator, an electric motor of the lubricator to drive a rotatable shaft of the lubricant container and displace a piston of the lubricant container couplable and/or coupled to the rotatable shaft;
- generating, with at least one sensor of the lubricator, a sensor signal indicative of at least one of a force exerted by the electric motor onto the rotatable shaft and a force exerted by the lubricant onto the container; and
- determining a blockage, e.g. a partial or full blockage, of an output of the container based on processing the sensor signal with the control circuitry of the lubricator.

A fifth aspect of the present disclosure relates to a computer program, which, when executed by one or more processors of a lubricator and/or lubrication system, instructs the lubricator and/or lubrication system to carry out the steps of the method, as described above and in the following.

A sixth aspect of the present disclosure relates to a non-transitory computer-readable medium storing a computer program, which, when executed by one or more processors of a lubricator and/or lubrication system, instructs the lubricator and/or lubrication system to carry out the steps of the method, as described above and in the following.

It should be noted that any feature, element, step and/or function described above and in the following with reference to one aspect of the present disclosure equally applies to any other aspect of the present disclosure. Specifically, any feature, element, step, and/or function described above and in the following with respect to the lubricator equally applies to the lubrication system and/or the method, and vice versa.

Further, it should be noted that any embodiment described hereinabove with reference to one aspect of the present disclosure can be combined with any other embodiment of the same or any other aspect. This may mean that any dependent claim can depend from any of the preceding claims.

These and other aspects of the invention will be apparent from and elucidated with reference to the embodiments described hereinafter.

BRIEF DESCRIPTION OF THE DRAWINGS

In the following, the invention is described with reference to the appended figures which give background explanations and represent exemplary embodiments of the invention.

The figures are schematic only and not true to scale. In principle, identical or like parts, elements and/or steps are provided with identical or like reference symbols in the figures.

DETAILED DESCRIPTION OF EXEMPLARY EMBODIMENTS

Figure 1A:
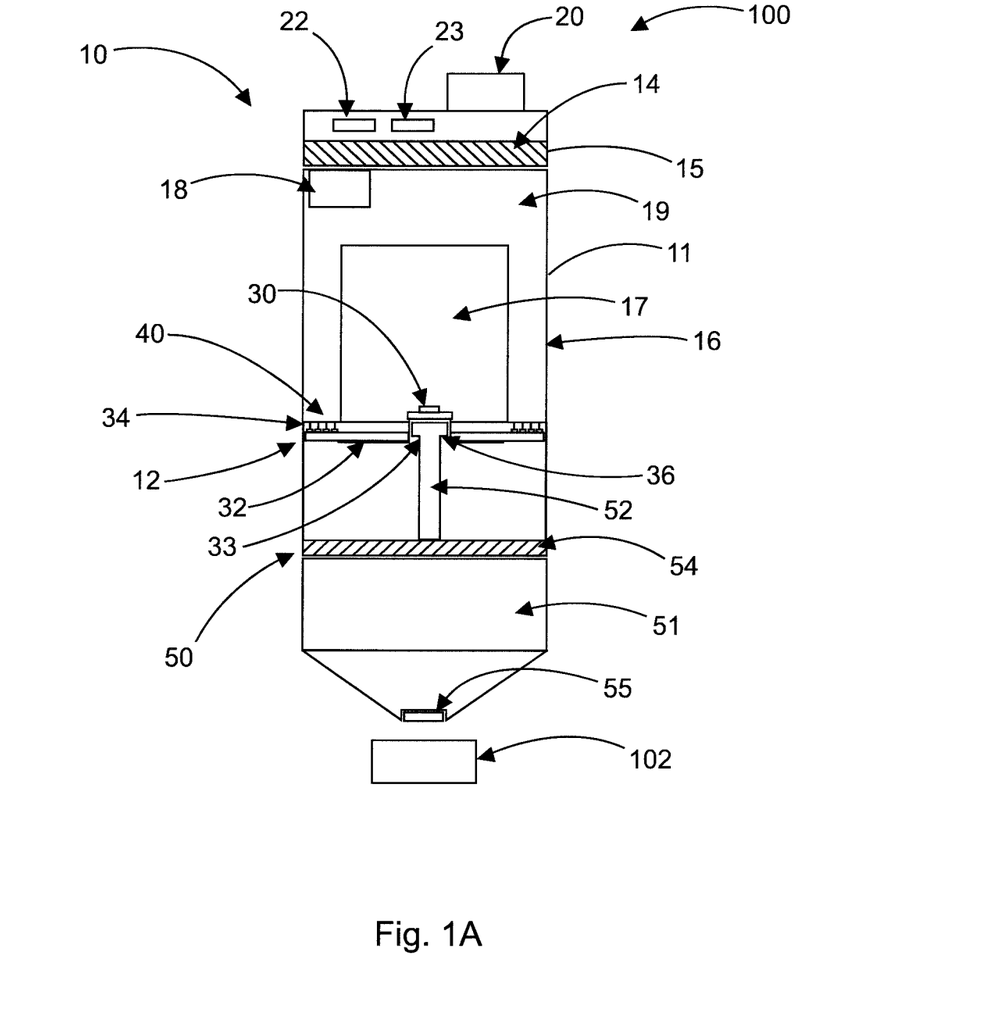
FIG. 1A shows a cross-sectional view of a lubrication system according to an exemplary embodiment.
Figure 1B:
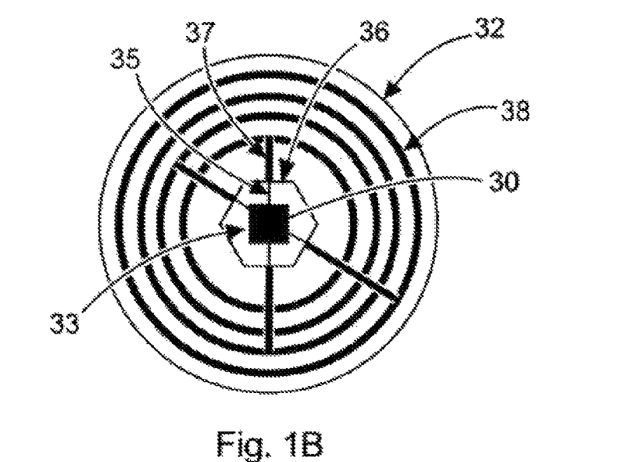
FIG. 1B shows a top view of a sensor and a rotatable circuit board of the lubrication system of FIG. 1A.
Figure 1C:
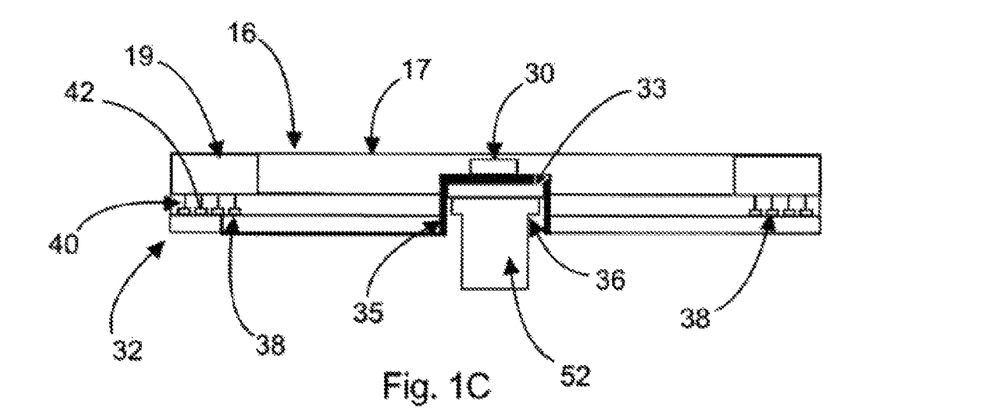
FIG. 1C shows a cross-sectional view of a sensor and a rotatable circuit board of the lubrication system of FIG. 1A.

FIG. 1A shows a cross-sectional view of a lubrication system 100 according to an exemplary embodiment. FIG. 1B shows a top view of a sensor 30 and a rotatable circuit board 32 of the lubrication system 100 of FIG. 1A. FIG. 1C shows a cross-sectional view of the sensor 30 and the rotatable circuit board 32 of FIG. 1B.

The lubrication system 100 comprises a lubricator 10 with a housing 11 having a coupling section 12 which is coupled to a lubricant container 50 of the lubrication system 100. The container 50 can be detachably attached to the lubricator 10 and/or the housing 11 by any suitable connection of the coupling section 12, such as e.g. a threaded coupling and/or threaded connection 34.

The lubricant container 50 comprises a rotatable shaft 52 and/or rotatable screw 52, on which a piston 54 is displaceably arranged, mounted and/or attached. Further, the container 50 contains a lubricant 51 which is to be dispensed via an outlet 55 and/or output 55 of the container 50, e.g. during a lubrication action. Upon rotation of the rotatable shaft 52, the piston 54 is displaced in a direction towards the output 55, such that a part of the lubricant 51 is pushed out of the output 55.

For driving the rotatable shaft 52 of the container 50, the lubricator 10 comprises an electric motor 16 and a control circuitry 14 for controlling and/or actuating the electric motor 16. The control circuitry 14 can be arranged at least partly on a Printed Circuit Board 15, PCB, arranged on a top side of the lubricator 10 opposite to the coupling section 12, the container 50 and/or the output 55. The PCB, however, can be arranged anywhere else. The electric motor 16 comprises a rotating part 17 and a static part 19. The static or immovable part 19 may e.g. refer to a stator and/or a motor housing 19 of the electric motor 16.

Optionally, the lubricator 10 may comprise a gearbox (not shown) which may be configured to change a rotational speed of the shaft 52 driven by the electric motor 16. For instance, based on the gearbox, the shaft 52 driven by the electric motor 16 via the gearbox, can be operated at a low rotational speed with higher force when the electric motor 16 operates with higher speed and lower force, and vice versa.

The control circuitry 14 is further coupled to a power supply 18, which provides the electrical power for driving the electric motor 16, the rotatable shaft 52 and/or the piston 54. The power supply 18 can comprise one or more batteries.

Alternatively or additionally, the power supply 18 may be connected to a supply grid and/or a power supply system.

The control circuitry 14 is configured to dispense a certain amount of lubricant 51, e.g. during a lubrication action, onto and/or into an object 102 that is to be lubricated, such as e.g. a part, portion and/or member of an industrial system, an apparatus and/or device. For instance, the object 102 may be a bearing 102.

Further, the lubricator 10 comprises at least one sensor 30, e.g. a pressure sensor and/or a force sensor, which is arranged within the housing 11 between the rotatable shaft 52 and the rotating part 17 of the electric motor 16.

The lubricator 10 further comprises a rotatable circuit board 32 via which the sensor 30 is supplied with electrical energy and/or via which a sensor signal generated by the sensor 30 is transmitted to the control circuitry 14, as will be further explained hereinbelow.

The rotatable circuit board 32 comprises a receptacle 36 and/or recess, in which an end 33 of the rotatable shaft 52 is at least partly arranged. As can be seen in FIG. 1B, the end 33 of the rotatable shaft 52 and the receptacle 36 or recess 36 of the rotatable circuit board 32 are formed and/or shaped correspondingly, such that by driving the rotatable shaft 52 with the electric motor 16 and/or the rotating part 17 thereof, also the rotatable circuit board 32 rotates with the same speed as the rotating part 17 of the electric motor 16.

Moreover, as the sensor 30 is arranged between the rotating part 17 of the electric motor 16 and the rotatable shaft 52 and/or the end 33 thereof and as the sensor 30 is mechanically coupled to the rotating part 17 of the electric motor 16, also the sensor 30 rotates with the same speed as the rotatable shaft 52 and the rotatable circuit board 32.

In the example shown in FIGS. 1A to 1C, the sensor 30 is configured to provide a sensor signal indicative of a force exerted by the electric motor 16 and/or rotating part 17 thereof onto the rotatable shaft 52. Further, the control circuitry 14 is configured to process the sensor signal and determine a blockage, e.g. a partial or full blockage, of the output 55 of the lubricant container 50. For this purpose, the control circuitry 14 may, for example, determine a measure or quantity correlating with the force exerted onto the rotatable shaft 52. The measure or quantity can for example be the force or a pressure exerted by the electric motor 16 onto the shaft 52.

Further, to determine the blockage of the output 55, the control circuitry 14 is configured to compare the determined measure or quantity that correlates with the force exerted onto the shaft 52 with a threshold value. If the determined measure or quantity reaches or exceeds the threshold, a partial or full blockage of the output 55 may have occurred.

The threshold value or a plurality of threshold values, e.g. threshold values for different types, sizes and/or geometries of the container 50, can be stored in a data storage 23 of the lubricator. The threshold value can alternatively or additionally be retrieved and/or accessed by the control circuitry 14 via a communication circuitry 22 of the lubricator 10.

It should be noted, however, that the sensor 30 can alternatively be arranged e.g. between a lateral surface of the end 33 of the shaft 52 and the rotating part 17 of the electric motor 16. In such configuration, the sensor 30 may determine, as the measure correlating with the force exerted onto the shaft 52, a torque exerted by the rotating part 17 and determine the blockage of the output 55 based on this measure and/or based on comparing this measure with a corresponding threshold. Further, the sensor 30 can also be arranged in the container 50, such that a force and/or pressure exerted by the lubricant 51 onto e.g. a wall of the container 50, the rotatable shaft 52 and/or the piston 54 can be determined as the measure or quantity correlating with the force, and compare this measure or quantity with a corresponding threshold value to determine the blockage of the output 55.

As noted above, the sensor 30 and the rotatable circuit board 32 rotate with the same speed as the rotating part 17 of the electric motor 16. In order to be able to transmit the sensor signal during rotation to the control circuitry 14 and/or in order to supply the sensor 30 with electrical power during rotation, the rotatable circuit board 32 comprises a plurality of circular read-out tracks 38 arranged on a side of the rotatable circuit board 32, which side faces the electric motor 16. In the example shown in FIGS. 1A to 1C, the rotatable circuit board 32 comprises four concentric read-out tracks 38. Any other number, however, is conceivable.

Further, the sensor 30 is connected to each of the read-out tracks 38 by electrical connections 35, 37. Therein, electrical connections 35 extend from the sensor 30 and the side of the rotatable circuit board 32, on which the read-out tracks 38 are arranged, to a further side of the rotatable circuit board 32 opposite to the side of the rotatable circuit board 32, on which the read-out tracks 38 are arranged. Further, electrical connections 37 connect to connections 35 and to the read-out tracks 38 on the further side of the rotatable circuit board 32 opposite to the side of the rotatable circuit board 32, on which the read-out tracks 38 are arranged. Accordingly, electrical connections 37 contact the read-out tracks 38 from beneath and/or from a side opposite to the electric motor 16.

In order to connect the control circuitry 14 with the read-out tracks 38 to transmit the sensor signal from the sensor 30 to the control circuitry 14, the lubricator 10 comprises a read-out interface 40 comprising a plurality of spring probes 42, wherein each of the spring probes 42 is spring-loaded and in contact with one of the read-out tracks 38. Therein, the read-out interface 40 is arranged between the immovable or static part 19 of the electric motor 16 and the rotatable circuit board 32. Accordingly, independent on the rotation angle of the rotatable circuit board 32, the read-out interface 40 always has an electrical connection to the read-out tracks 38, such that the sensor signal can be read by and/or transmitted to the control circuitry 14 during rotation of the rotatable circuit board 32, the sensor 30 and the rotating part 17 of the electric motor 16.

The exemplary configuration of the lubricator 10 and/or the lubrication system 100 of FIG. 1A to 1C advantageously allows to reliably and accurately determine the blockage of the output 55 in an automated manner. This can allow to ensure that the object 102 is lubricated with a sufficient amount of lubricant 51 at minimum maintenance cost and efforts. Further, as the sensor 30 is arranged in the housing 11 of the lubricator 10, replacement of the container 50 does not affect the sensor 30 and/or require replacement of the sensor 30. This can further reduce maintenance efforts and costs.

Optionally, a signal and/or warning signal can be triggered by the control circuitry 14 and transmitted via the communication circuitry 22, when the blockage of the output 55 is determined. Again, this can ensure proper lubrication of the object 102, while reducing maintenance efforts and costs. Therein, the communication circuitry 22 of the lubricator 10 can be a wired communication circuitry or a wireless communication circuitry. The communication circuitry 22 can be integrated into the housing 11. Therein, the communication circuitry 22 can comprise a corresponding communication interface. For instance, a signal or warning signal can be transmitted if a blockage of the output 55 has been detected.

Due to the fact that the lubricators 10 are often placed in a location with difficult access and it is not always possible to provide wires to them, the communication circuitry 22 used for transmission of the signal, warning signal and/or alarm message preferably is a wireless communication circuitry 22 (although not necessarily).

Also any other information, data and/or signals can be transmitted and/or received via the communication circuitry 22. For instance, such information, data and/or signals can relate to at least one parameter characterizing the power supply 18, at least one parameter characterizing the lubricator 10 and/or at least one parameter characterizing the object 102 and/or a machine on which the lubrication system 100 is mounted.

For example, the communication circuitry 22 can comprise a radio communication module, preferably enabling transmission over one or more wireless protocols, such as e.g. Bluetooth or W-Fi. This allows accessing the lubricator 10 with an external device like a smartphone or a laptop, or other external devices. Also, the communication circuitry 22 can communicate, for example, with a main MCU over HCI or UART interface, or it might be an MCU with integrated radio communication.

The lubricator 10 further comprises an indicator 20 and/or display 20 configured to display at least one information item. For instance, if a blockage of the output 55 is detected, this may be indicated on indicator 20. It should be noted, however, that any other information item can be shown or displayed on the indicator 20.

Figure 2:
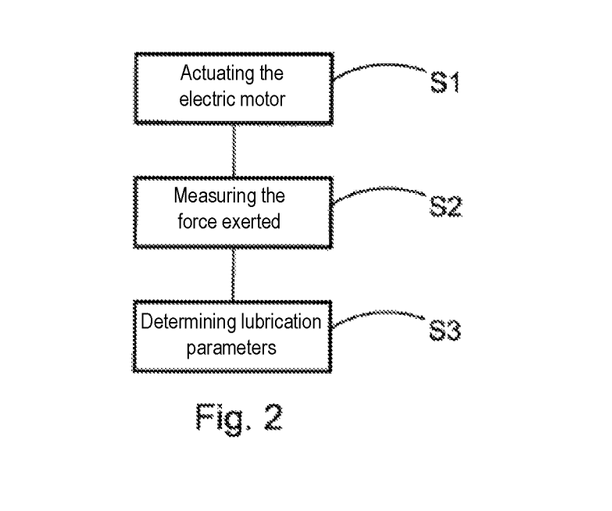
FIG. 2 shows a flowchart illustrating steps of a method of operating a lubricator according to an exemplary embodiment.

FIG. 2 shows a flowchart illustrating steps of a method of operating a lubricator 10 and/or a lubrication system 100 according to an exemplary embodiment. The method may likewise relate to a method of lubricating an object 102, e.g. using the lubricator 10 and/or the lubrication system 100.

In step S1 the electric motor 16 of the lubricator 10 is actuated by the control circuitry 14 to drive the rotatable shaft 52 of the lubricant container 50 and displace the piston 54 of the lubricant container 50 coupled to the rotatable shaft 52.

In step S2, a sensor signal indicative of at least one of a force exerted by the electric motor 16 onto the rotatable shaft 52 and a force exerted by the lubricant 51 onto the container 50 is generated by the at least one sensor 30 of the lubricator 10.

In a further step S3, a blockage, e.g. a partial or full blockage, of an output 55 of the container 50 is determined based on processing the sensor signal with the control circuitry 14 of the lubricator 10. Step S3 may optionally comprise determining a measure or quantity correlating with the force and comparing the measure or quantity with a threshold value in order to determine the blockage of the output 55.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. An automatic lubricator for lubricating an object, the lubricator comprising:
   a housing with a coupling section configured to couple with a lubricant container containing a lubricant, wherein the lubricant container comprises a rotatable shaft with a piston to dispense the lubricant from an output of the lubricant container;
   an electric motor configured to drive the rotatable shaft of the lubricant container, such that at least a part of the lubricant is dispensable from the lubricant container;
   at least one sensor configured to directly measure, and provide a sensor signal indicative of, at least one of a force exerted by the electric motor onto the rotatable shaft and a force exerted by the lubricant onto the container;
   a control circuitry configured to determine a blockage of the output of the lubricant container based on the sensor signal of the at least one sensor; and
   a rotatable circuit board mechanically coupled to a rotating part of the electric motor, such that the rotatable circuit board rotates in correspondence with a rotation of the rotating part of the electric motor.

2. The lubricator according to claim 1,
   wherein the at least one sensor is arranged within the housing.

3. The lubricator according to claim 1,
   wherein the control circuitry is configured to determine, based on the sensor signal, a measure correlating with the force exerted by the electric motor onto the rotatable shaft; and
   wherein the control circuitry is configured to determine the blockage of the output based on comparing the determined measure with a threshold value.

4. The lubricator according to claim 3,
   wherein the lubricator further comprises a data storage; and
   wherein the threshold value is stored in the data storage.

5. The lubricator according to claim 1,
   wherein the rotatable circuit board is electrically coupled with the at least one sensor.

6. The lubricator according to claim 1,
   wherein the rotatable circuit board comprises at least one circular read-out track arranged on one side of the rotatable circuit board;
   wherein the at least one circular read-out track is electrically coupled with the at least one sensor for reading-out the sensor signal of the at least one sensor.

7. The lubricator according to claim 6,
   wherein the rotatable circuit board comprises a plurality of concentric circular read-out tracks.

8. The lubricator according to claim 7, further comprising:
   a read-out interface arranged at an end of the electric motor;
   wherein the read-out interface is coupled to the at least one circular read-out track and to the control circuitry, such that the sensor signal of the at least one sensor is transmittable via the read-out interface to the control circuitry.

9. The lubricator according to claim 6, further comprising:
   a read-out interface arranged at an end of the electric motor;

wherein the read-out interface is coupled to the at least one circular read-out track and to the control circuitry, such that the sensor signal of the at least one sensor is transmittable via the read-out interface to the control circuitry.

10. The lubricator according to claim 9, wherein the read-out interface comprises a spring probe in contact with the at least one circular read-out track of the rotatable circuit board.

11. The lubricator according to claim 10, wherein the spring probe is spring-loaded.

12. The lubricator according to claim 9,
wherein the control circuitry comprises a control circuit board; and
wherein the rotatable circuit board and the control circuit board are arranged on opposite sides of the electric motor.

13. The lubricator according to claim 1, further comprising a communication circuitry configured to transmit a signal indicative of the output blockage to a receiver.

14. An automatic lubricator for lubricating an object, the lubricator comprising:
a housing with a coupling section configured to couple with a lubricant container containing a lubricant, wherein the lubricant container comprises a rotatable shaft with a piston to dispense the lubricant from an output of the lubricant container;
an electric motor configured to drive the rotatable shaft of the lubricant container, such that at least a part of the lubricant is dispensable from the lubricant container;
at least one sensor configured to directly measure, and provide a sensor signal indicative of, at least one of a force exerted by the electric motor onto the rotatable shaft and a force exerted by the lubricant onto the container; and
a control circuitry configured to determine a blockage of the output of the lubricant container based on the sensor signal of the at least one sensor,
wherein the at least one sensor is arranged at an end of the electric motor, such that the at least one sensor is arranged between the rotatable shaft and the electric motor, when the lubricant container is coupled to the lubricator.

15. The lubricator according to claim 14,
wherein the at least one sensor is arranged within the housing.

16. The lubricator according to claim 14,
wherein the control circuitry is configured to determine, based on the sensor signal, a measure correlating with the force exerted by the electric motor onto the rotatable shaft; and
wherein the control circuitry is configured to determine the blockage of the output based on comparing the determined measure with a threshold value.

17. The lubricator according to claim 16,
wherein the lubricator further comprises a data storage; and
wherein the threshold value is stored in the data storage.

18. The lubricator according to claim 14, further comprising a communication circuitry configured to transmit a signal indicative of the output blockage to a receiver.

19. An automatic lubricator for lubricating an object, the lubricator comprising:
a housing with a coupling section configured to couple with a lubricant container containing a lubricant, wherein the lubricant container comprises a rotatable shaft with a piston to dispense the lubricant from an output of the lubricant container;
an electric motor configured to drive the rotatable shaft of the lubricant container, such that at least a part of the lubricant is dispensable from the lubricant container;
at least one sensor configured to directly measure, and provide a sensor signal indicative of, at least one of a force exerted by the electric motor onto the rotatable shaft and a force exerted by the lubricant onto the container; and
a control circuitry configured to determine a blockage of the output of the lubricant container based on the sensor signal of the at least one sensor,
wherein the at least one sensor is mechanically coupled to a rotating part of the electric motor, such that the at least one sensor rotates in correspondence with a rotation of the rotating part of the electric motor.

20. The lubricator according to claim 19,
wherein the at least one sensor is arranged within the housing.

21. The lubricator according to claim 19,
wherein the control circuitry is configured to determine, based on the sensor signal, a measure correlating with the force exerted by the electric motor onto the rotatable shaft; and
wherein the control circuitry is configured to determine the blockage of the output based on comparing the determined measure with a threshold value.

22. The lubricator according to claim 21,
wherein the lubricator further comprises a data storage; and
wherein the threshold value is stored in the data storage.

23. The lubricator according to claim 19, further comprising a communication circuitry configured to transmit a signal indicative of the output blockage to a receiver.

* * * * *